(12) United States Patent
Alkhalidi

(10) Patent No.: US 11,326,039 B2
(45) Date of Patent: May 10, 2022

(54) CONTINUOUS RECYCLING OF RUBBER AND ORGANIC POLYMERS USING SUPERCRITICAL WATER OXIDATION CLOSED SYSTEM

(71) Applicant: SMART TIRE RECYCLING, INC., Pittsburgh, PA (US)

(72) Inventor: Abdulhaq Alkhalidi, Pittsburgh, PA (US)

(73) Assignee: SMART TIRE RECYCLING, INC., Pittsburgh, PA (US)

( * ) Notice: Subject to any disclaimer, the term of this patent is extended or adjusted under 35 U.S.C. 154(b) by 143 days.

(21) Appl. No.: 16/475,945

(22) PCT Filed: Jan. 5, 2018

(86) PCT No.: PCT/US2018/012560
§ 371 (c)(1),
(2) Date: Jul. 3, 2019

(87) PCT Pub. No.: WO2018/129298
PCT Pub. Date: Jul. 12, 2018

(65) Prior Publication Data
US 2019/0345307 A1 Nov. 14, 2019

Related U.S. Application Data

(60) Provisional application No. 62/498,741, filed on Jan. 6, 2017.

(51) Int. Cl.
*C08J 11/14* (2006.01)
*C08C 19/08* (2006.01)
(Continued)

(52) U.S. Cl.
CPC .......... *C08J 11/14* (2013.01); *A47J 37/0763* (2013.01); *A47J 37/0786* (2013.01); *B29B 17/04* (2013.01);
(Continued)

(58) Field of Classification Search
CPC ............ A47J 2037/0795; A47J 37/0763; A47J 37/0786; B29B 17/04; B29B 2017/0021;
(Continued)

(56) References Cited

U.S. PATENT DOCUMENTS 5,516,952 A * 5/1996 Lee .......................... C07C 1/322
585/241
5,849,964 A 12/1998 Holighaus et al.
(Continued)

OTHER PUBLICATIONS

Chen et al., "Depolymerization of Tire and Natural Rubber Using Supercritical Fluids", Approximate Reasoning in Intelligent Systems, Decision and Control, Pergamon Press, Oxford, GB, vol. 44, No. 1, Jan. 1, 1995, pp. 53-60.
(Continued)

*Primary Examiner* — Frances Tischler
(74) *Attorney, Agent, or Firm* — Ference & Associates LLC

(57) ABSTRACT

An embodiment provides a method for recycling tires, including: injecting, using a pump, a rubber material into a dissociating system, wherein the pump exerts a mechanical force upon the rubber material to reduce a size of the rubber material; within the dissociating system, creating a rubber material mixture, by: injecting a supercritical fluid to be mixed with the rubber material; heating, using a heat source, the rubber material mixture; and atomizing the rubber material mixture; and sending the resulting atomized rubber material mixture to a separating system to separate the
(Continued)

rubber material mixture into different components. Other aspects are described and claimed.

20 Claims, 6 Drawing Sheets

(51) Int. Cl.
  *C10G 1/10* (2006.01)
  *B29B 17/04* (2006.01)
  *C10L 3/06* (2006.01)
  *A47J 37/07* (2006.01)
(52) U.S. Cl.
  CPC ............... *C08C 19/08* (2013.01); *C10G 1/10* (2013.01); *C10L 3/06* (2013.01); *A47J 2037/0795* (2013.01); *B29B 2017/0428* (2013.01); *C10L 2200/0469* (2013.01)
(58) Field of Classification Search
  CPC .... B29B 2017/0428; B29B 2017/0456; B29B 2017/0496; B29L 2030/00; C08C 19/08; C08J 11/14; C08J 2319/00; C10G 1/10; C10L 2200/0469; C10L 2290/02; C10L 3/06; C10L 3/08; Y02P 20/54; Y02W 30/62
  See application file for complete search history.

(56) References Cited

U.S. PATENT DOCUMENTS

| | | | |
|---|---|---|---|
| 6,680,110 B1 * | 1/2004 | Deeb | ................ B01J 3/008 428/327 |
| 2003/0125401 A1 * | 7/2003 | Tzoganakis | ............. C08J 11/16 521/41 |

OTHER PUBLICATIONS

European Patent Office, Supplementary Search Report for European Application Serial No. EP18736736, dated Dec. 5, 2019, 2 pages, The Hague, Netherlands.

* cited by examiner

TABLE 1 - MOISTURE

| SAMPLE | MOISTURE, % |
|---|---|
| CARBON BLACK | 14.44 |

FIG. 3

TABLE 2 - VOLATILE MATTER

| SAMPLE | VOLATILE CONTENT, % |
|---|---|
| CARBON BLACK | 48.28 |

FIG. 4

Summary of Carbon Black Primary Particle Size Data

| Sample | Average Particle Size, nm | Standard Deviation, nm | n (Number of Particles Counted) | Maximum Particle Size, nm | Minimum Particle Size, nm | Estimated Type | ASTM Std, nm |
|---|---|---|---|---|---|---|---|
| CB | 36.25 | 13.64 | 200 | 81.60 | 11.63 | N400 | 31-39 |

FIG. 5 large volume, size, and weight of a rubber material. Tire recycling, the recycling of rubber, vulcanized rubber, organic material, or the like, in particular, poses a challenge to society and the environment. Tires, by nature, may be highly durable products. Tires must withstand the wear and tear of driving, and must withstand heat, UV radiation, extreme environmental conditions, or the like. These properties make tires a challenge for continuous recycling, not only because the rubber itself is difficult to breakdown, but also because the tire generally contains other products, for example, metal, textile materials, and the like. Due to this recycling challenge, many recycling centers do not accept tires, thereby encouraging individuals to illegally dump unwanted tires or burn tires, which is detrimental to the environment. If a tire does enter the recycling stream, the tire may be stockpiled or ground up to create other products such as soft mulch, but have few other uses as a ground up tire. Other recycling efforts attempt to capture the energy by burning the tires for power production.

CONTINUOUS RECYCLING OF RUBBER AND ORGANIC POLYMERS USING SUPERCRITICAL WATER OXIDATION CLOSED SYSTEM

CLAIM FOR PRIORITY

This application claims priority to Provisional Application Ser. No. 62/498,741, filed on Jan. 6, 2017, in the United States, the contents of which are incorporated by reference in their entirety.

BACKGROUND

Recycling rubber products present a challenge due to the large volume, size, and weight of a rubber material. Tire recycling, the recycling of rubber, vulcanized rubber, organic material, or the like, in particular, poses a challenge to society and the environment. Tires, by nature, may be highly durable products. Tires must withstand the wear and tear of driving, and must withstand heat, UV radiation, extreme environmental conditions, or the like. These properties make tires a challenge for continuous recycling, not only because the rubber itself is difficult to breakdown, but also because the tire generally contains other products, for example, metal, textile materials, and the like. Due to this recycling challenge, many recycling centers do not accept tires, thereby encouraging individuals to illegally dump unwanted tires or burn tires, which is detrimental to the environment. If a tire does enter the recycling stream, the tire may be stockpiled or ground up to create other products such as soft mulch, but have few other uses as a ground up tire. Other recycling efforts attempt to capture the energy by burning the tires for power production.

There are an estimated 1.2 billion vehicles on the road worldwide. The United States represents a large percentage of this total with approximately 264 million registered passenger vehicles. Each of these vehicles typically has 4 tires each, plus tractor trailers, dump trucks, off road vehicles, aircraft, and the like, which add to these estimates. Therefore, the number of tires, which have a finite service life due to wear or breakdown, represents a recyclable commodity. Greener or environmentally conscious recycling allows recapture of raw materials and saves on societal waste. Shredding tires may yield only a limited number of products from the shredding process. Burning the tire, even in a plant designed for this purpose, may still pollute the environment and may not be the best option for conservation. For example, there is a possibility of combustion byproducts such as zinc oxide, polychlorinated dibenzodioxins, furans, and heavy metals that may be released into the surrounding area. These toxic products may enter the soil, waterways, groundwater, animals, or humans surrounding the tire fueled energy plant.

Simply dumping tires even at a designated landfill poses many detrimental problems. For example, a tire may have an estimated 75% void. This empty space may take up valuable landfill space. Additionally, tire piles above the surface may be problematic. Water may pool within the inner surface of the tire and harbor disease bearing insects such as mosquitoes. Piles of tires may be susceptible to fires which produce thick black smoke, are difficult to extinguish, and are hazardous to the environment.

BRIEF SUMMARY

One embodiment provides a method for recycling tires, comprising: injecting, using a pump, a rubber material into a dissociating system, wherein the pump exerts a mechanical force upon the rubber material to reduce a size of the rubber material; within the dissociating system, creating a rubber material mixture, by: injecting a supercritical fluid to be mixed with the rubber material; heating, using a heat source, the rubber material mixture; and atomizing the rubber material mixture; and sending the resulting atomized rubber material mixture to a separating system to separate the rubber material mixture into different components.

Another embodiment provides an apparatus for recycling tires, comprising: a pump that injects a rubber material into a dissociating system, wherein the pump exerts a mechanical force upon the rubber material to reduce a size of the rubber material; the dissociating system that creates a rubber material mixture by: injecting a supercritical fluid to be mixed with the rubber material; heating, using a heat source, the rubber material mixture; and atomizing the rubber material mixture; and a separating system that separates the atomized rubber material mixture into different components from the rubber material mixture.

A further embodiment provides a product for recycling tires, comprising: a pump that injects a rubber material into a dissociating system, wherein the pump exerts a mechanical force upon the rubber material to reduce a size of the rubber material, wherein the rubber material comprises rubber extracted from tires; the dissociating system that creates a rubber material mixture, wherein the dissociating system comprises: an injector that injects a supercritical fluid to be mixed with the rubber material; a heat source that heats the rubber material mixture; and an atomization chamber that atomizes the rubber material mixture; and a separating system that separates the atomized rubber material mixture into different components from the rubber material mixture.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example of moisture content during the oxidation process.

FIG. 4 illustrates an example of volatile matter during the oxidation process.

FIG. 5 illustrates an example of carbon black primary particle size during the rubber recycling process.

DETAILED DESCRIPTION

Figure 1:
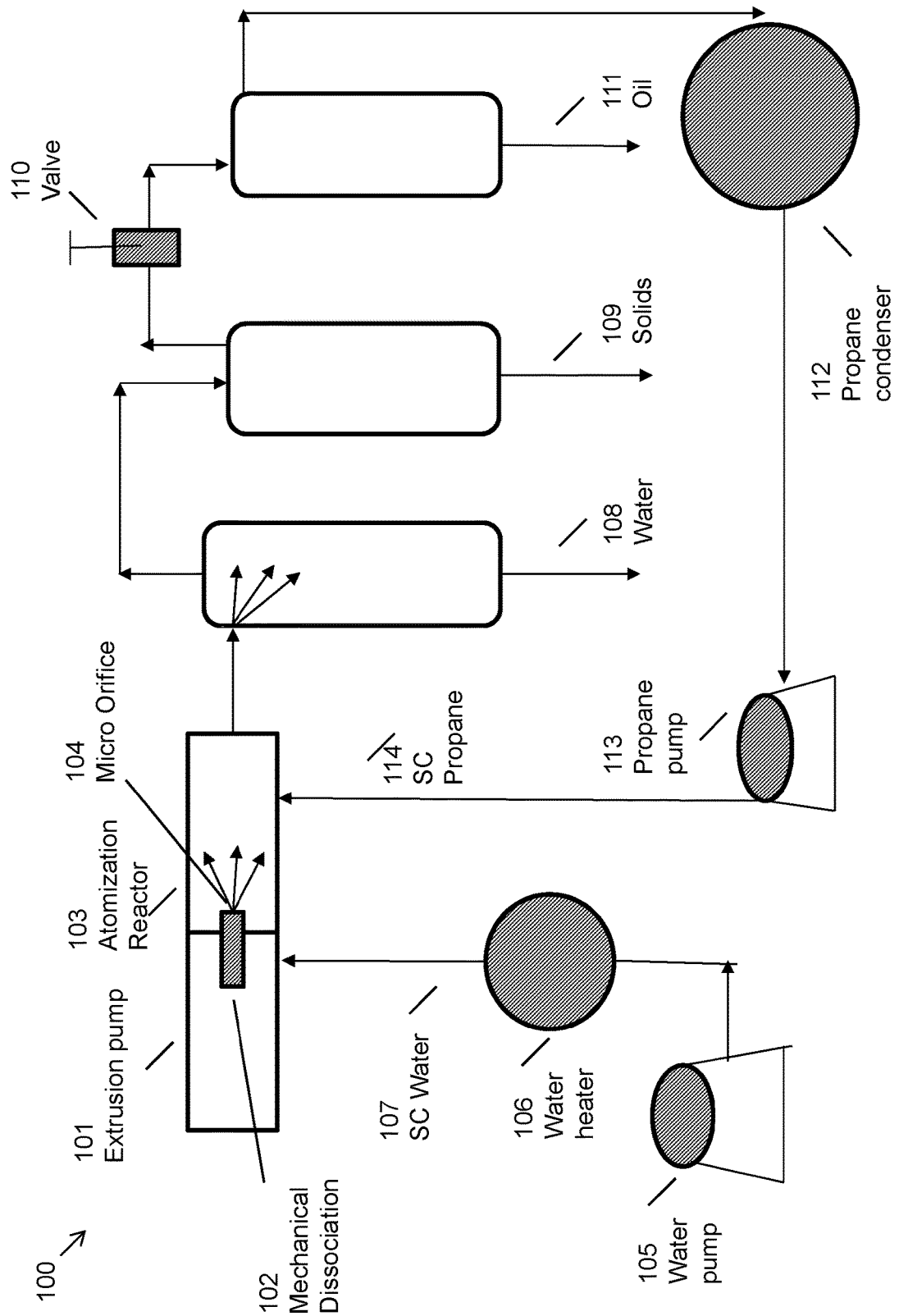
FIG. 1 illustrates an example embodiment of tire rubber recycling as described herein.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Tire recycling is a large challenge for society both presently and in the future. World-wide the number of vehicles on the road is increasing and that growth may be accelerating. As developing nations require more vehicles, there may be an increased consumption of tires. Tires are designed to be durable and are, thus, produced using materials that can withstand difficult conditions. Tires may be designed for use on or off-road. Even the best cared for and properly maintained/driven tires eventually wear out. It is possible that catastrophic events such as potholes, curbs, road debris, UV damage, dry-rotting, or the like, may shorten the expected life of a tire. Additionally, some governments may mandate minimum tread depths or service life of a tire as safe for vehicles. Thus, at some point, the tire is no longer usable and must be discarded. Since many recycling centers do not accept tires, disposal of the tires is very difficult for a consumer. Additionally, those facilities that do accept tires generally do not capture any materials that could be useful from the tires. For example, tires may represent a resource for the ingredients of a tire including oil, carbon black, and the like. However, current tire waste management and recycling may not capture these materials or do so in an environmentally friendly manner.

What is needed is a method and apparatus for continuous recycling rubber material, for example, tires, vulcanized rubber, or other rubber materials. The example of tires will be used here throughout for ease of readability. However, it should be understood that the process as described herein can be used on any rubber material. Ideally, the system, as described in more detail herein, will recapture the components or ingredients that went into the original tire manufacturing process, and by recycling the raw ingredients, create a lower environmental impact as compared to current methods. The method may use supercritical water oxidation of rubber using pressure, temperature and/or, mechanical dissociation (agitation).

Accordingly, in an embodiment a method or apparatus may perform a continuous de-polymerization process of solid particles. The solid particles may be rubber crumbs. For example, the rubber crumb may be a tire mechanically broken apart and separated from belts, strands, textile fibers, or the like, within the tire. In embodiment, a continuous de-polymerization process may be performed by a pump, which may be an extrusion pump, gear pump, heavy grease pump, or the like. In one embodiment, supercritical water may be injected into a high-pressure reactor. The diluted rubber suspension at high temperature and pressure may be atomized into the supercritical water reaction chamber. The atomization may be performed by jet spray micro-orifices (up to 1:1,000,000,000). The supercritical water may be obtained by a high-pressure liquid pump pressurizing the water, and a heat source heating the water, for example, to a temperature of at least 375 degrees Celsius. The supercritical water may break down larger molecules of a larger rubber piece via oxidation. The oxidation may break the rubber down into components such as natural gas, oil, solids, carbon black, or the like.

In an embodiment, the pump may pressurize, then atomize the diluted broken down rubber and/or propane suspension into a reaction chamber of supercritical water. The oxidation reaction rate may be increased depending on the relative large surface area of the atomized fluid which may contain various molecular species in the molten rubber in the presence of supercritical water.

The continuous mixing of reactants using atomization in supercritical water, may result in a supercritical solution of a depolymerization mixture of rubber in supercritical water, which may comprise supercritical water, oil, natural gas, and suspended particles of carbon black. This mixture is continuously atomized inside a secondary reactor of supercritical propane. Oil and natural gas may be dissolved in the supercritical propane. The remaining undissolved mixture may include solids such as carbon black, water, or the like. Thus, in an embodiment, the results of the reaction are continuously separated into fractions using separation vessels (cyclone separation) according to gravity. In an embodiment, water (density=1) may be separated and removed from the bottom of a mixture vessel, in another vessel most of the carbon black carbons are removed due to larger density compared to a propane/oil solution.

In an embodiment, an additional vessel may be depressurized to about 1500 psi. In these conditions, propane may not have solvation power of supercritical and, thus, the oil may be phased out of the propane solution. In an embodiment, propane and natural gas may be condensed into liquid, and may be fed back to the pump and/or condensed into liquid through cooling. For example, the gas may be continuously pressurized, heated, re-used, condensed, or the like.

The illustrated example embodiments will be best understood by reference to the figures. The following description is intended only by way of example, and simply illustrates certain example embodiments.

Referring to FIG. 1, an example embodiment of a rubber recycling schematic is illustrated. In an embodiment, unwanted rubber tires may be recycled. The tire may undergo a process to mechanically breakup a tire prior to the recycling process. The mechanical break up may cut up the tires into smaller, more manageable chunks or parts. The mechanical breakup may also serve to break up a tire such that more surface area of the smaller chunks of rubber exposed. Additionally or alternatively, the mechanical breakup may separate the rubber from any steel, threads, fabric material, or the like, that may have been included in the tire.

Rubber material ready for recycling may be placed into the rubber recycling system 100 of FIG. 1. In an embodiment, the rubber material may be placed into a pump 101. In an embodiment, the pump may be an extrusion pump, gear pump, heavy grease pump, or the like. The temperature in the pump may be 375 degrees Celsius or may be higher. The pressure in the pump may be in the range of 3500 to 5000 pounds per square inch (PSI). In an embodiment, the pump may then inject the rubber material into a dissociation system. The dissociation system may include a single chamber or multiple chambers, which may be configured as a single large chamber that is divided into separate chambers or may be configured as multiple completely separate chambers, or a combination thereof. The dissociating system may contain a mechanical dissociation means 102, which may break down the rubber material into smaller pieces and particles. In an embodiment, a mechanical dissociation means may be a rotating screw, the meshing of gears, a piston, or the like. The mechanical dissociation means may mix the rubber material with other added components.

In an embodiment, additional components may be added to either the pump or the dissociating system. In an embodiment, the water may be pressurized using a water pump 105 and may be heated using a water heater 106. The pressurized and heated water may form supercritical (SC) water 107. In an embodiment, the supercritical water may be injected into the pump 101 or the dissociating system, and may be referred to as a first supercritical fluid. The first supercritical fluid may be water or water plus an oxidant such as $H_2O_2$. Additionally or alternatively, the supercritical water may be injected into an atomization chamber 103 included within the dissociating system, and may be referred to as a second supercritical fluid. The second supercritical fluid may be $CO_2$, propane, pentane, or the like. The system may include one or both of the supercritical fluids. In an embodiment, the mechanical dissociation means and the supercritical water dissociate the rubber material, meaning that the rubber material is broken down into smaller pieces and particles and components of the rubber. In other words, the dissociation attempts to unbond the components of the rubber to produce the components that were originally mixed together to create the rubber. In an embodiment, the mechanical dissociation means, supercritical water, and supercritical propane may, in isolation or in any combination, dissociate the rubber material. In an embodiment, the water may be recaptured from a system to be used again.

In an embodiment, a heat source may heat the dissociating systems and/or the contents within the dissociating system, for example, the rubber material mixture comprising the rubber injected by the pump and the supercritical fluid. In an embodiment, the heat source may be propane. In an embodiment, the heat source may be a band heater on the pump or atomization reactor. Other heat or fuel sources are possible and contemplated, for example, natural gas, electric heat, or the like. Propane may be the dilution fluid source for the heating because the propane can be collected from a separation apparatus that separates the components of the rubber material mixture. In other words, the propane may be a product of the tire recycling process, thereby making it a good choice as the heat source. For example, the separation apparatus may separate propane from the atomized rubber material mixture. The propane may then be condensed using a propane condenser 112. Alternatively or additionally, the propane, or other fuel source, may be from a source outside a separation apparatus such as a commercial gas line, a storage tank, or the like. The propane may then be pumped or pressurized by a propane pump 113, and the supercritical propane 114 may be injected into the pump, atomization chamber, a separation vessel, or other chamber within the system. Alternatively or additionally, the supercritical propane may be injected into the atomization reactor 103.

In an embodiment, a pseudohomogeneous, or vicious, mixture of rubber material and supercritical water may be formed. In an embodiment, the pseudohomogeneous mixture may undergo a substantially instantaneous oxidation under supercritical conditions. The substantially instantaneous oxidation at supercritical conditions for water may break up the rubber material, for example, by causing scission of carbon-carbon, carbon-sulfur, and sulfur-sulfur bonds in the rubber material. The reaction may convert the rubber material to smaller and smaller molecular weight components. The smaller molecular weight components may yield lower molecular weight hydrocarbons and/or oxygenated hydrocarbons. Although the smaller molecular weight products may be of any size, hydrocarbons of 3 to 8 carbon atoms may be preferred. In an embodiment, the water molecules may act as a non-polar solvent. The water may form a cage like structure surrounding the smaller hydrocarbon molecules which may result from the oxidation process.

In an embodiment, the dissociation of the rubber material may be performed under supercritical conditions. The atomization reaction may contain additional reactants. Additional reactants may include xylene, alkanes, alkenes, dienes, aromatics such as benzene, toluene, sulfur containing hydrocarbons, or the like. Additional reactants may also include oxygenated hydrocarbons such as alcohols, carboxylic acids, aldehydes, ketones, or the like. The additional reactants may include rubber fragments, carbon dioxide, water, or other combustion products such as nitrous oxide, halide acids, or the like. The additional reactants may be used in any combination to improve the reaction at supercritical conditions.

In the dissociating system, the rubber material mixture may be atomized. For example, the rubber material may be squeezed through an orifice 104. The orifice may be a micro orifice, a spray jet orifice, a spray jet micro orifice, or the like. The orifice may atomize the rubber material after a mechanical dissociation, heat, and supercritical liquid treatment. The atomization chamber may have a temperature between 120-375 degrees Celsius. The atomization chamber may have a pressure in the range of 1600-4000 PSI.

In an embodiment, the dissociating system may include an atomization reactor 103. With this atomization reactor, the reactants prior to atomization may be subjected to the effects of a French press. The French press effect may subject the molecule of the reactants and small particles of carbon black into a high level of friction like stress. The high level of friction like stress may be referred to as a stampede. The stampede of reactants prior to atomization in combination with propane at super critical pressure may exert force upon the reactants molecules. After the sudden force upon the reactant molecules, a substantially sudden expansion may favor the break-up of the reactant molecules into smaller particles. In other words, the mixture may be heated and pressurized. The pressure may be suddenly decreased, causing parts of the mixture to quickly expand, similar to popcorn popping, and break or explode into smaller particles. The smaller particles may be nano particles that are made of components of the rubber, for example, carbon black.

In an embodiment, the rubber material may become an elastomer blend after mechanical dissociation and exposure to a supercritical fluid. The elastomer blend may comprise large yields of lower molecular weight hydrocarbons and large yields of oxygenated hydrocarbons. The oxygenated hydrocarbons may have a molecular weight in the 3-8 carbon range. The products of the reaction may be used for multiple goods. These goods may include a substitute heating fuel, high-grade fuel substitutes for gasoline after further refinement or fractionation, specialty chemical, commodities, or the like.

In an embodiment, an amount of rubber material used relative to an amount of supercritical water may vary. This ratio may vary based upon on the type of rubber material used, a reaction temperature, a reaction pressure, an oxidant concentration, a resident time in the reaction, or the like. In an embodiment, a determination may be made based on the rubber material to ensure the temperature rise generated from an exothermic reaction is less than a maximum temperature necessary to melt an oxidation vessel. This temperature constraint may be determined based upon a particular rubber polymer weight, the heat of combustion associated with a particular rubber composition, an amount of oxidant used, a reactor pressure, a reaction starting temperature, or the like.

The system may include a separating system. The separating system may be downstream in the process after atomization. For example, the viscous mixture of rubber particles and supercritical water, also referred to as the rubber material mixture, may be pushed through jet spray micro orifices, as described above with respect to the atomization. This atomized rubber material mixture may be a grease-like mixture which may contain oil and natural gas. The grease-like mixture may be dissolved in supercritical propane to release the oil and natural gas, thereby leaving undissolved solids such as carbon black, water vapor, or the like.

In an embodiment, the undissolved solids of the grease-like mixture may be separated into fractions. For example, carbon black, solids, and water, may be recaptured in a vessel or in separate vessels, for example, as represented by 108, 109, and 111. In an embodiment, oil and water may be separated from a non-supercritical phase of the mixture in a vessel or in separate vessels. In an embodiment, propane, natural gas, or the like may be separated from a gas phase. For the gas separation, a gas may be condensed into liquid through pressurization with a pump. In an embodiment, a gas may be continuously pressurized, heated, re-used, condensed, or the like.

In other words, at least portion of the product from the atomization reactor may pass into a vessel in which water 108 may be collected. Another portion of the product from the atomization reactor may pass into a vessel in which solids and/or carbon black 109 may be collected. Another portion of the product from the atomization reactor may pass into a vessel in which oil and/or petroleum 111 products may be collected. Each of the vessels may be in any order, and may be combined. As an example, the water may be collected first, solids second, and the oil third. As another example, the solids may be collected first, water second, and the oil third. In an embodiment, there may be a valve 110 to recapture the heat source such as propane. As discussed above, the recaptured heat source may be used to heat the oxidation reaction of rubber material, used as a fuel source within or outside the facility, stored for a later use, or the like.

Figure 2:
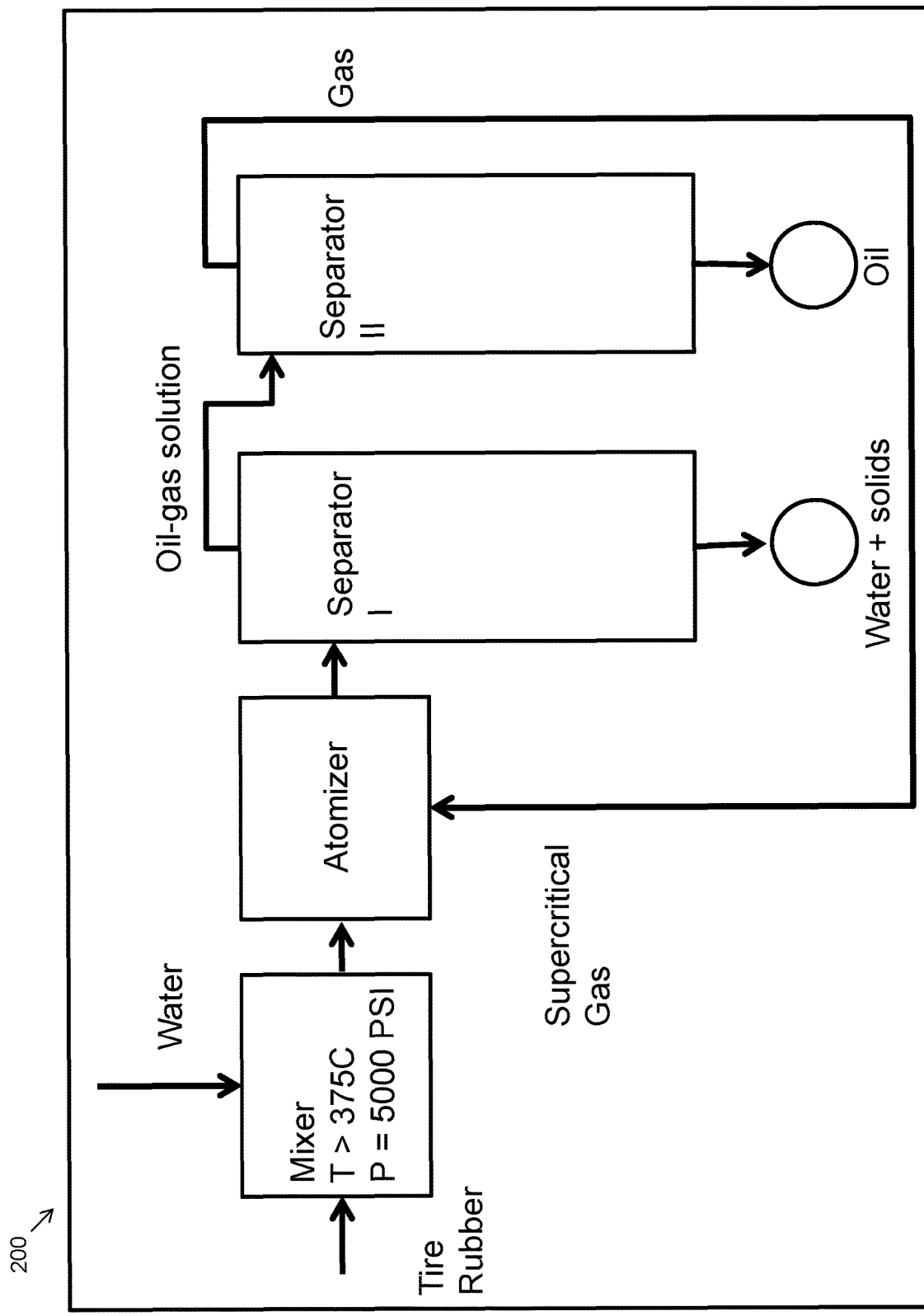
FIG. 2 illustrates an example embodiment of tire rubber recycling as described herein.

FIG. 2 illustrates a more high-level overview of the apparatus as discussed in connection with FIG. 1. Again, the apparatus may be used in the recycling of tires. The components, steps, reactions, methods, or the like of FIG. 2 may be used in conjunction with or as an alternative to the components, steps, reactions, methods, or the like of FIG. 1.

Although parameters for the oxidation reaction, which separates the components of the rubber, may vary, some example embodiments are disclosed. For example, referring to FIG. 3, the moisture content of carbon black may be about 14.44%, referring to FIG. 4, the volatile content of the carbon black may be about 48.28%, and referring to FIG. 5, the particle size of carbon black may be about 36.25 nanometer (nm), and in a range of about 11.63 to 81.60 nm. These specifications are examples, and other values and ranges are contemplated and disclosed.

The oxidation reaction and separation of reactants of the rubber material may have a system or method of control. For example, in determining the temperature, volume, or other parameters of supercritical fluid or heat source to be added to the mixture, the system may include a control system or computer that can use information to calculate or maintain the desire parameters of the oxidation reaction. The system may use circuits, circuitry, or components as illustrated in FIG. 6.

Figure 6:
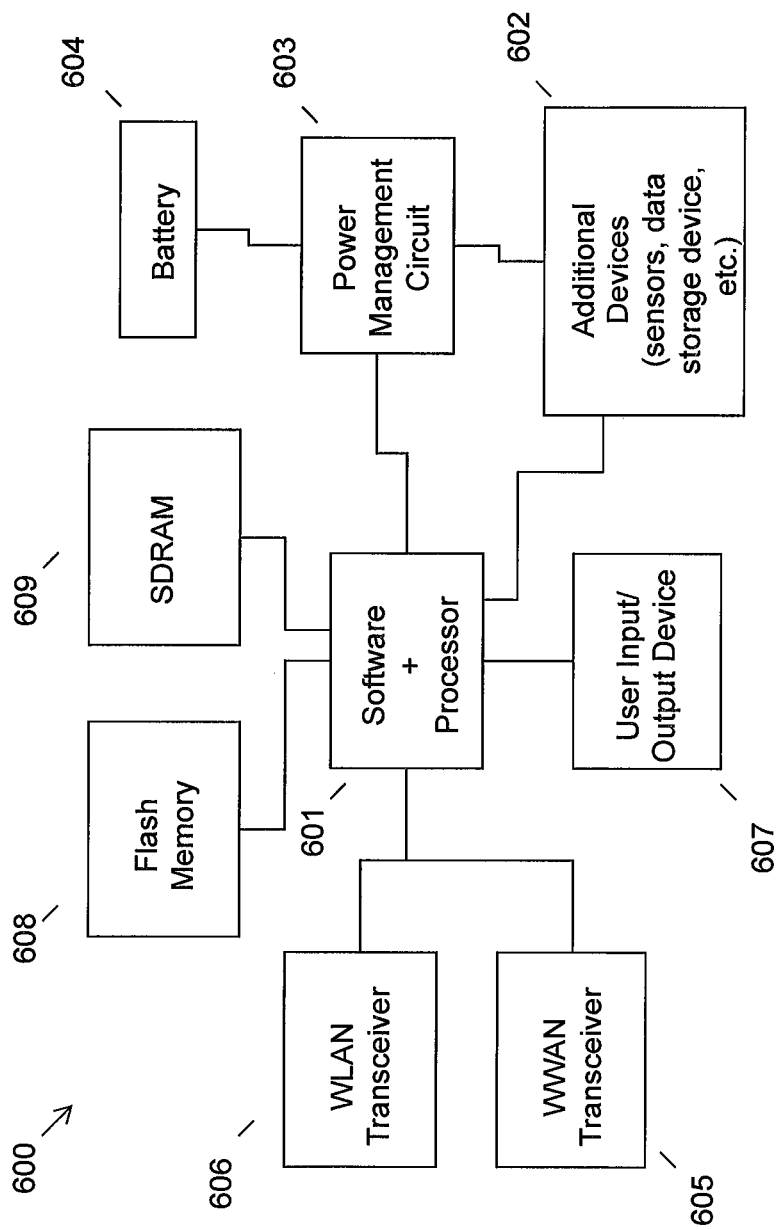
FIG. 6 illustrates an example of computer circuitry.

While various other circuits, circuitry or components may be utilized in information handling devices, with regard to an instrument for measuring fluid level and velocity according to any one of the various embodiments described herein, an example is illustrated in FIG. 6. For example, the device circuitry 600 as illustrated in FIG. 6 may be used within the pressure meter to measure the pressure of the fluid, a temperature system to measure and control the temperature of the system, within a computer that controls the entire system and the advancement of the mixture from one portion of the system to another, or the like. The device circuitry 600 may also be incorporated across multiple components of a larger system. For example, the components within or connected to the system may include a portion of the components of FIG. 6, while another remote device may include other components illustrated in FIG. 6, for example, the device illustrated in FIG. 6 may include a particular computing platform (e.g., mobile computing, desktop computing, etc.) including software and processor(s) may be combined in a single chip 601. Processors comprise internal arithmetic units, registers, cache memory, busses, I/O ports, etc., as is well known in the art. Internal busses and the like depend on different vendors, but essentially all the peripheral devices (602) may attach to a single chip 601. The circuitry 600 may combine the processor, memory control, and I/O controller hub all into a single chip 610. Common interfaces may include SPI, I2C and SDIO.

There are power management chip(s) 603, e.g., a battery management unit, BMU, which manage power as supplied, for example, via a rechargeable battery 604, which may be recharged by a connection to a power source (not shown). In at least one design, a single chip, such as 601, is used to supply BIOS like functionality and DRAM memory.

System 600 typically includes one or more of a WWAN transceiver 605 and a WLAN transceiver 606 for connecting to various networks, such as telecommunications networks and wireless Internet devices, e.g., access points. Additionally, devices 602 are commonly included, e.g., sensors (e.g., pressure sensor), data storage devices (e.g., external hard drive, local hard drive, cloud storage, etc.), and the like. System 600 includes input/output devices 607 for data input and display/rendering (e.g., a computing location located away from the single beam system that is easily accessible by a user). System 600 also typically includes various memory devices, for example flash memory 608 and SDRAM 609.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data.

Embodiments may be implemented as an instrument, system, method or program product. Accordingly, an embodiment may take the form of an entirely hardware embodiment, or an embodiment including software (including firmware, resident software, micro-code, etc.) that may all generally be referred to herein as a "circuit," "module" or "system." Furthermore, embodiments may take the form of a program product embodied in at least one device readable medium having device readable program code embodied thereon.

A combination of device readable storage medium(s) may be utilized. In the context of this document, a device readable storage medium ("storage medium") may be any tangible, non-signal medium that can contain or store a program comprised of program code configured for use by or in connection with an instruction execution system, apparatus, or device. For the purpose of this disclosure, a storage medium or device is to be construed as non-transitory, i.e., not inclusive of signals or propagating media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for recycling tires, comprising:
    injecting, using a pump, a rubber material into a dissociating system, wherein the pump exerts a mechanical force upon the rubber material to reduce a size of the rubber material;
    within the dissociating system, creating a rubber material mixture, by:
    injecting a first supercritical fluid to be mixed with the rubber material in a chamber upstream of an orifice;
    heating, using a heat source, the rubber material mixture;
    atomizing the rubber material mixture;
    injecting a second supercritical fluid in an atomization chamber downstream of the orifice; and
    sending the resulting atomized rubber material mixture to a separating system to separate the rubber material mixture into different components.

2. The method of claim 1, wherein the pump comprises an internal mechanical device and is selected from the group consisting of: a screw, a gear, and a piston.

3. The method of claim 1, wherein the pump is selected from the group consisting of: an extrusion pump, a gear pump, and a heavy grease pump.

4. The method of claim 1, wherein the injecting, using a pump, the rubber material further comprises injecting the second supercritical fluid at the atomization chamber of the dissociation system at the pump, wherein the second supercritical fluid comprises propane.

5. The method of claim 1, wherein the first supercritical fluid comprises water.

6. The method of claim 1, further comprising pressurized propane as an extracting media.

7. The method of claim 1, wherein the separating system comprises a system that separates the atomized rubber material mixture into a water fraction, a solids fraction, an oil fraction, and a heat source fraction.

8. The method of claim 1, wherein the first supercritical fluid depolymerizes the rubber material.

9. The method of claim 1, wherein the atomizing comprises pressurizing and heating the rubber material mixture and suddenly decreasing the pressure.

10. The method of claim 1, wherein the rubber material comprises rubber material from a preprocessed tire.

11. An apparatus for recycling tires, comprising:
    a pump that injects a rubber material into a dissociating system, wherein the pump exerts a mechanical force upon the rubber material to reduce a size of the rubber material;
    the dissociating system that creates a rubber material mixture by:
    injecting a first supercritical fluid to be mixed with the rubber in a chamber upstream of an orifice;
    heating, using a heat source, the rubber material mixture;
    atomizing the rubber material mixture;
    injecting a second supercritical fluid in an atomization chamber downstream of the orifice; and
    a separating system that separates the atomized rubber material mixture into different components from the rubber material mixture.

12. The apparatus of claim 11, wherein the pump comprises an internal mechanical device and is selected from the group consisting of: a screw, a gear, and a piston.

13. The apparatus of claim 11, wherein the pump is selected from the group consisting of: an extrusion pump, a gear pump, and a heavy grease pump.

14. The apparatus of claim 11, wherein the second supercritical fluid is injected at the atomization chamber of the dissociation system at the pump, wherein the second supercritical fluid comprises propane.

15. The apparatus of claim 11, wherein the first supercritical fluid comprises water.

16. The apparatus of claim 11, further comprising pressurized propane as an extracting media.

17. The apparatus of claim 11, wherein the separating system comprises a system that separates the atomized rubber material mixture into a water fraction, a solids fraction, an oil fraction, and a heat source fraction.

18. The apparatus of claim 11, wherein the first supercritical fluid depolymerizes the rubber material.

19. The apparatus of claim 11, wherein the atomizing comprises pressurizing and heating the rubber material mixture and suddenly decreasing the pressure.

20. A product for recycling tires, comprising:

a pump that injects a rubber material into a dissociating system, wherein the pump exerts a mechanical force upon the rubber material to reduce a size of the rubber material, wherein the rubber material comprises rubber extracted from tires;

the dissociating system that creates a rubber material mixture, wherein the dissociating system comprises:

an injector that injects a first supercritical fluid to be mixed with the rubber material in a chamber upstream of an orifice;

a heat source that heats the rubber material mixture;

an atomization chamber that atomizes the rubber material mixture;

a second injector that injects a second supercritical fluid in an atomization chamber downstream of the orifice; and a separating system that separates the atomized rubber material mixture into different components from the rubber material mixture.

* * * * *